US006847999B1

United States Patent
Dodrill et al.

(10) Patent No.: US 6,847,999 B1
(45) Date of Patent: Jan. 25, 2005

(54) APPLICATION SERVER FOR SELF-DOCUMENTING VOICE ENABLED WEB APPLICATIONS DEFINED USING EXTENSIBLE MARKUP LANGUAGE DOCUMENTS

(75) Inventors: Lewis Dean Dodrill, Richmond, VA (US); Ryan Alan Danner, Glen Allen, VA (US); Steven J. Martin, Richmond, VA (US); William Bateford Willaford, IV, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 611 days.

(21) Appl. No.: 09/588,294

(22) Filed: Jun. 7, 2000

Related U.S. Application Data

(60) Provisional application No. 60/152,316, filed on Sep. 3, 1999.

(51) Int. Cl.[7] ........................................... G06F 15/173
(52) U.S. Cl. ....................... 709/225; 709/223; 709/226; 709/229
(58) Field of Search ................................ 709/223, 225, 709/226, 229, 217, 219, 218, 203

(56) References Cited

U.S. PATENT DOCUMENTS

| | | | |
|---|---|---|---|
| 4,837,798 A | | 6/1989 | Cohen et al. |
| 6,112,242 A | * | 8/2000 | Jois et al. ................... 709/225 |
| 6,115,686 A | * | 9/2000 | Chung et al. ............... 704/260 |
| 6,269,336 B1 | * | 7/2001 | Ladd et al. .................. 704/270 |
| 6,381,320 B1 | * | 4/2002 | Creamer et al. ........ 379/201.01 |
| 6,385,583 B1 | * | 5/2002 | Ladd et al. .................. 704/270 |
| 6,490,564 B1 | * | 12/2002 | Dodrill et al. ............... 704/275 |
| 6,496,205 B1 | * | 12/2002 | White et al. ................. 345/824 |
| 6,507,817 B1 | * | 1/2003 | Wolfe et al. ................. 704/260 |
| 6,578,000 B1 | * | 6/2003 | Dodrill et al. ............... 704/270 |
| 6,636,831 B1 | * | 10/2003 | Profit et al. .................. 704/275 |

OTHER PUBLICATIONS

BOS, "XML in 10 Points", W3.org (Aug. 26, 1999).

* cited by examiner

*Primary Examiner*—Saleh Najjar
(74) *Attorney, Agent, or Firm*—Leon R. Turkevich

(57) ABSTRACT

A unified web-based voice messaging system provides voice application control between a web browser and an application server via an hypertext transport protocol (HTTP) connection on an Internet Protocol (IP) network. The application server, configured for executing a voice application defined by XML documents, also is configured for describing the voice application by collecting, for each of the XML documents, attributes describing execution of the XML documents in an application runtime environment, and generating for storage on a tangible medium an output file that describes the voice application based on at least a portion of the collected attributes selected by a user. Hence, the voice applications defined by XML documents can be considered as self-documenting, and the act of writing the applications using XML documents generates the necessary information for creating and formatting documentation in accordance with the attributes (i.e., context) provided by the application runtime environment.

44 Claims, 7 Drawing Sheets

```
Program Hello World

Function MenuOne {
  SpeakPromptToUser ("To Say 'Hello world!,' press one.  To say 'Goodbye
                     world!,' press zero.");
  UserInput = GetInputFromUser ("SingleDigit");
  If (UserInput == "0") {
    SpeakPromptToUser ("Goodbye World!");
    FunctionCall (MenuTwo);
  } else if (UserInput =="1") {
    SpeakPromptToUser ("Hello World!");
    FunctionCall (MenuTwo);
  } else {
    SpeakPromptToUser ("You have entered an incorrect number, press one to
                       say 'Hello world!,' or press zero to say 'Goodbye
                       World!'.");
    FunctionCall (MenuOne);
  }
}

Function MenuTwo {
  SpeakPromptToUser ("To try again, press one.  To exit the application press
                     two.");
  UserInput = GetInputFromUser ("SingleDigit");
  If (UserInput == "1") {
    FunctionCall (MenuOne);
  } else if (UserInput =="1") {
    EXIT APPLICATION!
  } else {
    SpeakPromptToUser ("You have entered an incorrect number, press one to
                       try again, or press two to exit the application");
    FunctionCall (MenuTwo);
  }
}

Function Main {
  FunctionCall (MenuOne);
}
```

APPLICATION SERVER FOR SELF-DOCUMENTING VOICE ENABLED WEB APPLICATIONS DEFINED USING EXTENSIBLE MARKUP LANGUAGE DOCUMENTS

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/501,516, filed Feb. 1, 2000 entitled Arrangement for Defining and Processing Voice Enabled Web Applications Using Extensible Markup Language Documents, the disclosure of which is incorporated in its entirety herein by reference, discloses an arrangement for defining a voice-enabled web application using extensible markup language (XML) documents that define the voice application operations to be performed within the voice application. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment. Each XML document may also reference another XML document to be executed based on the relative position of the XML document within the sequence of voice application operations to be performed. The XML documents are stored for execution of the voice application by an application server in an application runtime environment.

The application server disclosed in the above-incorporated application Ser. No. 09/501,516 executes the voice-enabled web application by runtime execution of the extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction.

Hence, web programmers can write voice-enabled web applications, using the teachings of the above-incorporated application Ser. No. 09/501,516, by writing XML pages that specify respective voice application operations to be performed. The XML documents have a distinct feature of having tags that allow a web browser (or other software) to identify information as being a specific kind or type of information.

One recurring problem in application development is the necessity for documenting applications. In particular, documentation of voice applications (e.g., code-level functional call flows, user-level call flows, prompt sequences and listings, user input requirements, etc.) has typically been a manual process undertaken by a combination of product managers, software developers, and testers. Due to the manual nature of defining the application, creating the application, and documenting the application, the process tends to the error prone. The manual process typically results in incomplete documentation, for example due to the product being released and shipped before the product is fully documented.

The manual documentation process has been a necessity because many voice applications are written in general-purpose programming languages, and because the interface (e.g., menus, prompt, user input requirements) are inseparable from the code. In view of the complex rules surrounding the written code, it becomes very difficult to determine what information is useful for the documentation process, and what information is extraneous.

SUMMARY OF THE INVENTION

There is a need for an arrangement that enables voice applications to be documented based on interpretation of application-defining parameters by an application server. In particular, there is a need for arrangement that enables generation of documentation for voice applications, where an application server configured for executing a voice application also can extract documentation parameters for creating and formatting documentation for the voice application.

These and other needs are attained by the present invention, where an application server, configured for executing a voice application defined by XML documents, is configured for describing the voice application by collecting, for each of the XML documents, attributes describing execution of the XML documents in an application runtime environment, and generating for storage on a tangible medium an output file that describes the voice application based on at least a portion of the collected attributes selected by a user.

One aspect of the present invention provides a method in an application server configured for executing a voice application. The method includes parsing an extensible markup language (XML) document having XML tags for defining voice application operations, collecting attributes describing execution of the XML tags by the application server within an application runtime environment, and generating for storage on a tangible medium an output file that describes the voice application by outputting at least a portion of the collected attributes based on a user selection. Use of XML documents to define voice application operations enables the separation of user interface logic from application logic; hence, the parsing of XML tags enables the identification of attributes that describe the execution of the XML tags within the application runtime environment. These attributes are then collected for each XML document, enabling the application runtime environment to generate an output file that describes the voice application according to a format selected by a user. Hence, a user can request generation of documents that describe the voice application in any format, for example a relationship diagram that identifies interrelated XML documents and application functions, a user prompt menu to assist users navigating menu options generated by the voice application, a resource utilization table that specifies resources necessary for selected XML documents, and/or a call flow diagram that specifies the sequence of voice application operations.

Another aspect of the present invention provides an application server including a storage medium configured for storing extensible markup language (XML) documents having XML tags that define voice application operations for a voice application, and an application runtime environment. The application runtime environment is configured for generating an output file that describes selected attributes of the voice application, and includes a parser configured for determining attributes of the respective XML tags within each of the XML documents according to the application runtime environment. The application runtime environment also includes a context collection module configured for storing the determined attributes, the application runtime environment selecting the stored determined attributes based on a user selection. Since the voice application operations are defined by the XML documents, the XML parser can identify attributes of the voice application, for example the relationship of operations specified by the XML tags to resources, procedures, and other XML documents accessible by the application runtime environment. Hence, the application runtime environment can generate an output file in any user-selectable format that describes any desired attribute of the voice application defined by XML documents.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 4 is a diagram illustrating a conventional arrangement of defining an application using executable code.

BEST MODE FOR CARRYING OUT THE INVENTION

Figure 1:
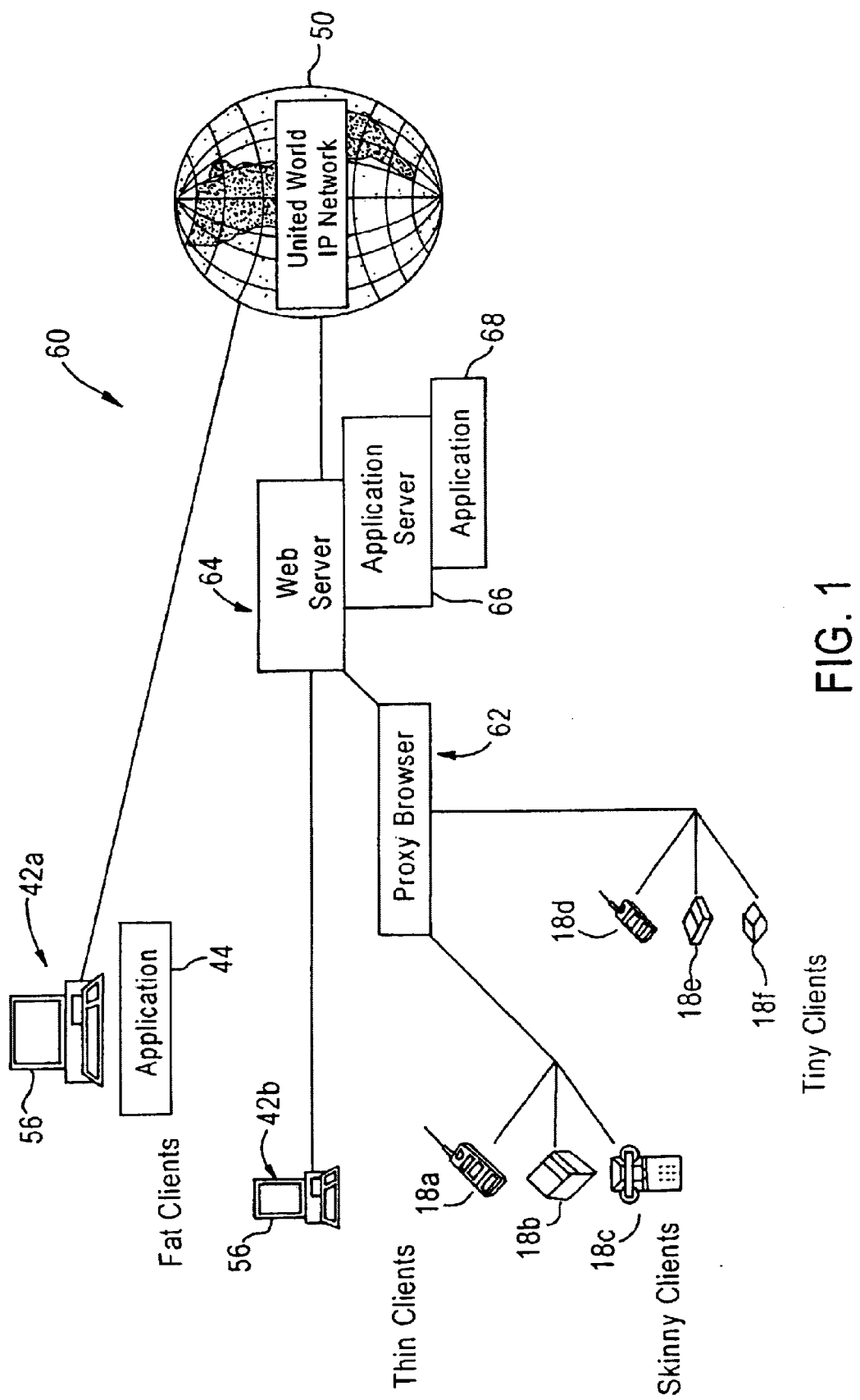
FIG. 1 is a block diagram illustrating an architecture system enabling execution and documentation of voice enabled web applications according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/501,516. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser, in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generates new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 166 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

Figure 2:
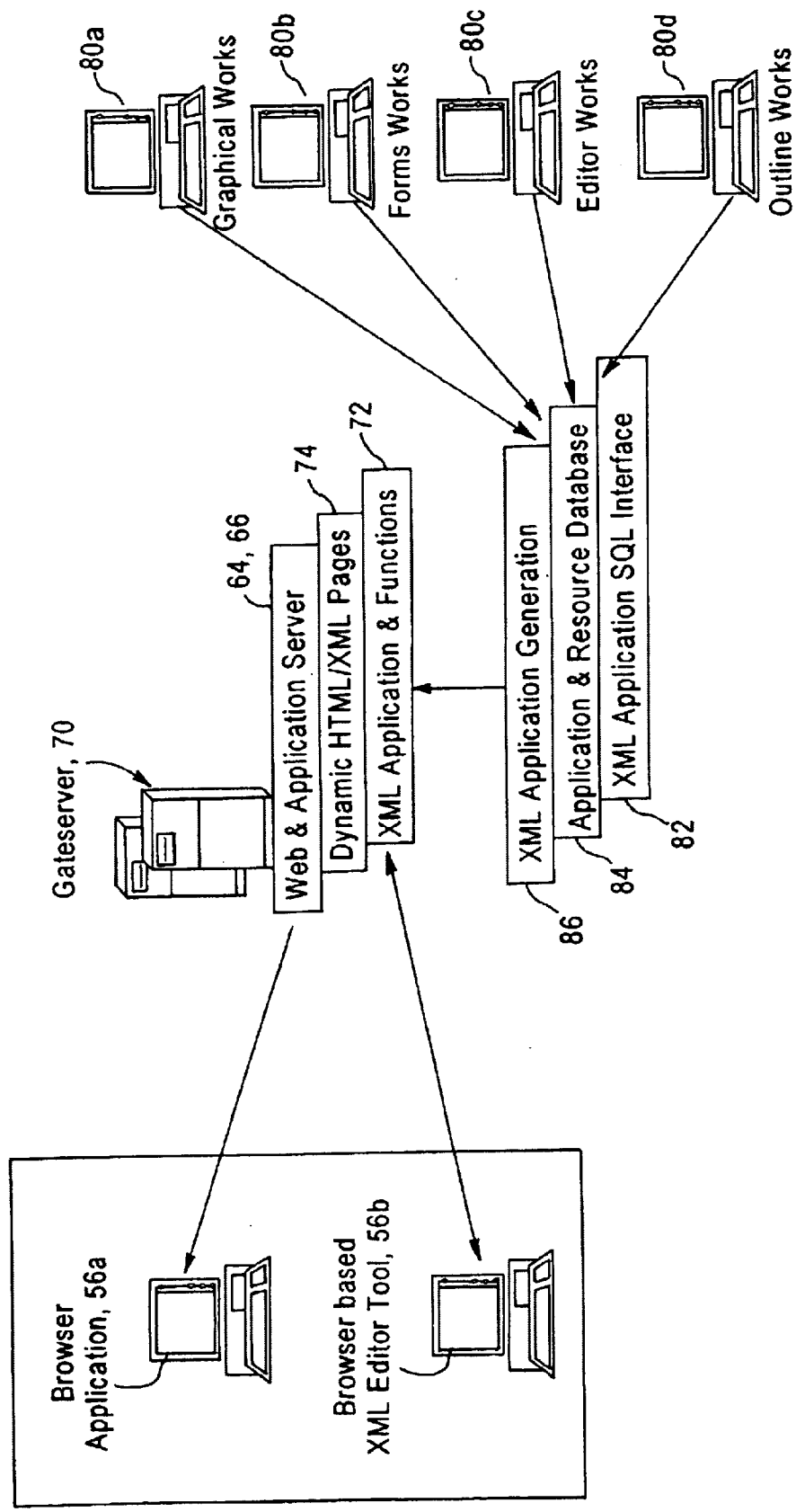
FIG. 2 is a diagram illustrating development tools usable for development of the voice enabled web applications.

FIG. 2 is a diagram illustrating development tools usable for development of the voice enabled web applications. As shown in FIG. 2, the web server 64, the application server 66, and the voice web applications 68 reside within a gateserver 70. The gateserver 70 provides HTTP access for a browser based XML editor tool 56b that enables a web programmer to design voice applications by editing XML pages. The XML pages are stored as XML applications and functions 72, for example within a database accessible by the application server 66. The XML pages stored within the XML application and functions database 72 define the actual application operations to be performed by the application server 66 in its application runtime environment. Hence, the application server 66 executes stored XML applications and functions 72, and in response generates dynamic HTML pages having XML tags, also referred to as HTML/XML pages 74.

Certain development tools having direct access to the application server 66 can be used to establish context information used by the application runtime environment within the application server 66 for execution application operations based on parsing of XML documents. In particular, development tools such as a graphic based development system 80a, a forms-based development system 80b, an editor-based development system 80c, or an outline-based development system 80d may be used to define XML tags and procedure calls for the application runtime environment. The development tools 80 may be used to establish an application and resource database 84 to define low-level operations for prescribed XML tags, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag.

The development tools 80 may be used to establish an application programming interface (API) library 112 (e.g., a SQL interface) for the application runtime environment, enabling the application server 66 to issue prescribed function calls to established services, such as IMAP, LDAP, or SMTP. The library 112 may be implemented as dynamically linked libraries (DLLs) or application programming interface (API) libraries.

Figure 3A:
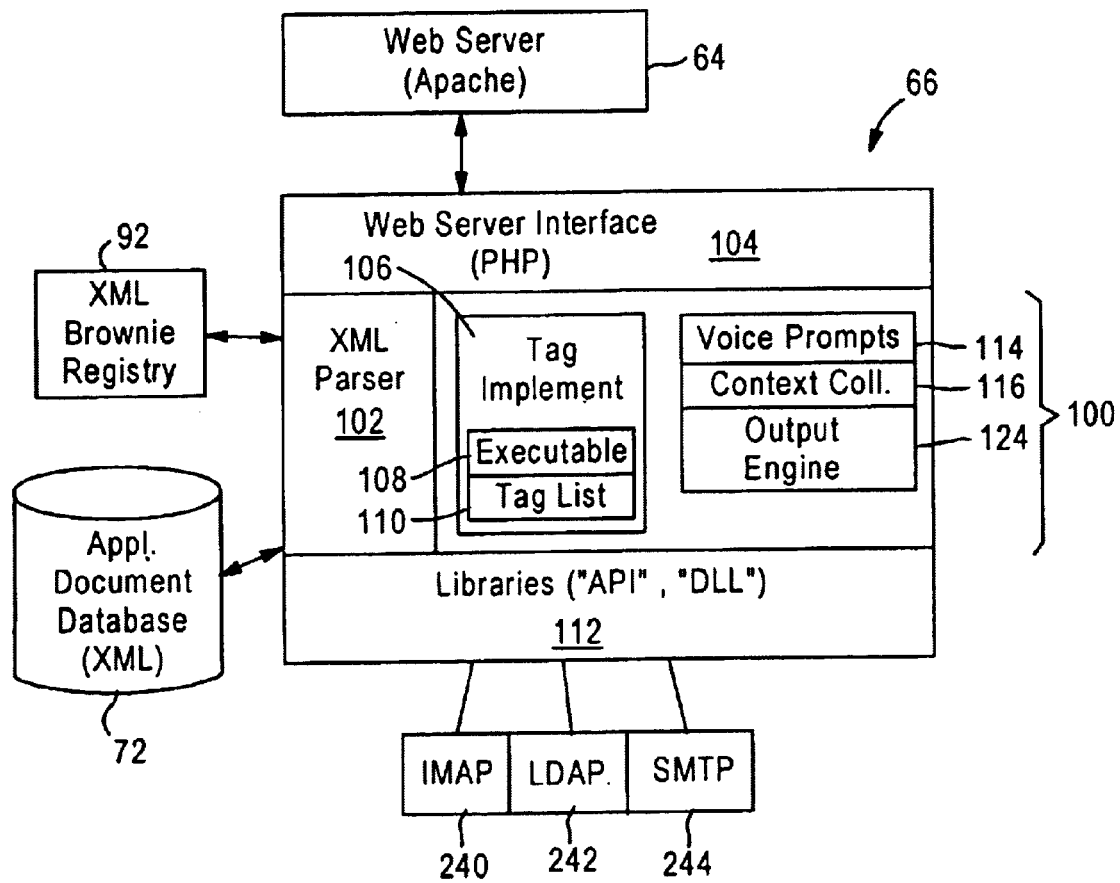
FIGS. 3A and 3B are diagrams illustrating in further detail the application server of FIG. 2.
Figure 3B:
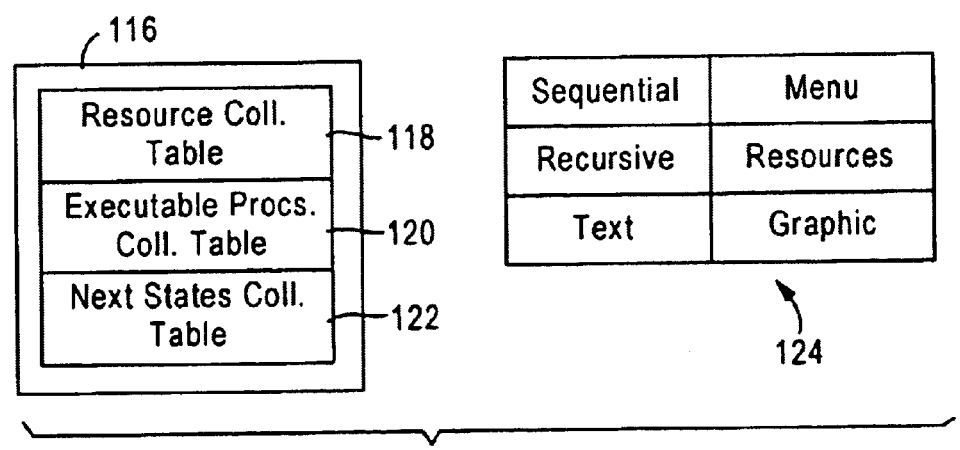

FIGS. 3A and 3B are diagrams illustrating in detail the application server 66. The application server 66 is implemented as a server executing a PHP hypertext processor with XML parsing and processing capabilities, available open source at http://www.php.net. As shown in FIG. 3A, the server system 66 executes an application runtime environment 100 that includes an XML parser 102 configured for parsing the application-defining XML documents (e.g., XML document 100) stored in the XML document database 72, or the XML documents (i.e., "brownies") stored in the registry 92 and configured for specifying the state and attributes for respective user sessions. The application server 66 also includes a high speed interface 104 that establishes a high-speed connection between the application server 66 and the web server 64. For example, the PHP hypertext processor includes a high-speed interface for Apache Web servers.

The runtime environment 100 is configured for execution of the parsed XML documents. The runtime environment 100 includes a tag implementation module 106 that implements the XML tags parsed by the XML parser 102. The tag implementation module 106 performs relatively low-level operations for execution of user interface operations, logic operations, or procedure calls. In particular, the tag implementation module 106 includes an executable tag resource library 108 that includes executable routines for selected XML tags (e.g., selected XML tags implemented using executable code such as C), which may be instantiated during initialization of the application runtime environment 100, or as needed upon execution of the corresponding XML tag operation. The tag implementation module 106 also includes an XML tag list 110 that "describes" the corresponding operation by specifying any logical operation, resource, procedure call etc. to implement the corresponding tag.

Hence, the tag implementation module 106 enables implementation of the XML tags within the context of the application runtime environment 100. For example the tag implementation module 106 dynamically generates an XML menu page using executable functions specified by a menu rule set in response to detecting a menu tag, performs a logical operation using executable functions specified by a logic rule set in response to a decision tag, or fetches an audio (.wav) file in response to detecting a an XML tag specifying an audio file as a resource. Hence, the tag implementation module 106 implements the tag operations that are specified within the XML framework of the stored XML documents, performing any one of a user interface operation, a logic operation, or a procedure call as specified by the parsed XML document by executing a corresponding set of executable functions based on the rule set (specified by the executable tag resource library 108 or the XML tag list 110) for the corresponding operation.

The application runtime environment 100 also includes a voice prompts resource directory 114 that specifies the location of resources, such as .wav files, specified in the XML documents. Hence, the voice prompts resource directory 114 enables the application runtime environment 100 to access, either locally or remotely, stored .wav files used as voice prompts specified in the XML documents. Each voice prompt may also include corresponding text data that specifies the contents of the corresponding voice prompt: the text data may be stored within the header of the voice prompt, may be stored as a separate text file linked to the .wav file, or may be integrated within the .wav file itself.

The application server 66 also includes a set of libraries 112 that may be implemented as dynamically linked libraries (DLLs) or application programming interface (API) libraries. The libraries 112 enable the runtime environment 100 to implement the procedures as specified by the appropriate XML document. For example, the application server 66 may issue a function call to one of a plurality of IP protocol compliant remote resources 240, 242, or 244 according to IMAP protocol, LDAP Protocol, or SMTP protocol, respectively. For example, the PHP hypertext processor includes executable routines capable of accessing the IMAP or LDAP services, where the XML tags that reference those services are defined in the tag implementation module 106 (e.g., as executable code in the executable resource library 108 or rule sets within the XML tag list 110). Note that the mechanisms for accessing the services 240, 242, or 244 should be established within the library 112 before use of XML documents that reference those services. Once the mechanisms for accessing the services 240, 242, or 244 are established in the library 112, the application runtime environment 100 can perform a function operation by using executable functions specified by a function call rule set in the tag implementation module 106.

As described above, the tag implementation module 106 specifies the rule sets for XML tags, enabling specific operations to be performed for each parsed XML tag, within the context of the application runtime environment 100. For example, the tag implementation module 106 includes rule sets that define four types of XML documents used by the application server 66 to execute web-based voice applications: menu documents, activity documents, decision documents, and "brownies". The menu documents, activity documents, and decision documents are XML documents, stored in the document database 72, that define user interface and boolean-type application logic for a web application, hence are considered "executable" by the application server 66. The brownie document, stored in a separate registry 92, is an XML data record used to specify application state and user attribute information for a given XML application during a user session. Hence, the XML documents define user interface logistics and tie services and application server events together in a meaningful way, forming a coherent application or sets of applications. Additional details regarding the definition of executable voice applications using XML documents are described in the above-incorporated application Ser. No. 09/501,516.

The disclosed embodiment directed to an arrangement that generates documents that describe voice-enabled web applications based on interpreting the XML documents that define the voice-enabled web application operations within the context of the application runtime environment 100.

The application runtime environment 100 includes a context collection module 116 and an output module 124, illustrated in detail in FIG. 3B. The context collection module 116 is configured for storing XML tag attributes determined by the parser 102 based on context information derived from the tag implementation module 106 within the application runtime environment 100. The context collection module 116 includes a resource collection table 118 configured for storing resources determined by the XML parser 102 to be referenced by a corresponding parsed XML document. The context collection module 116 also includes an executable procedures collection table 120, configured for storing executable procedures (e.g., procedure calls to the procedures library 112) referenced by the corresponding parsed XML document. The context collection module 116 also includes a possible next states collection table configured for storing possible next states of the voice application as specified by the corresponding parsed XML document. Each of the tables 118, 120, and 122 also are configured for storing the attributes on a per-XML document basis. Hence, each application-defining XML document has its own corresponding entry in the tables 118, 120, and 122 for storing of the corresponding attributes.

Hence, the structured nature of XML documents that permits voice-enabled web applications to be executed by the application runtime environment 100 based on a prescribed set of rules also enables the application runtime environment 100 to generate a document that identifies the relationships between XML documents, based on user selection and based on the attributes collected within the context collection module 116 for each of the XML documents.

The application runtime environment 100 also includes an output module 124 configured for generating the output document file based on the user selection. In particular, the output module 124 includes scripts for generating documents that describe the voice application according to prescribed output formats. The output module 124 also is configured for accessing selected attributes from the tables 118, 120 and 122 for selected XML documents using a sequential or recursive technique, depending on the type of output format. Exemplary output formats include: a user prompt menu that enables a user to follow a sequence of prompts within the menu structure specified by the XML documents; a resource utilization table that identifies all the resources within the voice prompts resources directory 114 that are used by selected XML documents, and/or graphic output format for diagrams such as a call flow diagram. Hence, the output module 124 accesses selected attributes from the context collection module 116, depending on the type of output format desired by the user.

Figure 5:
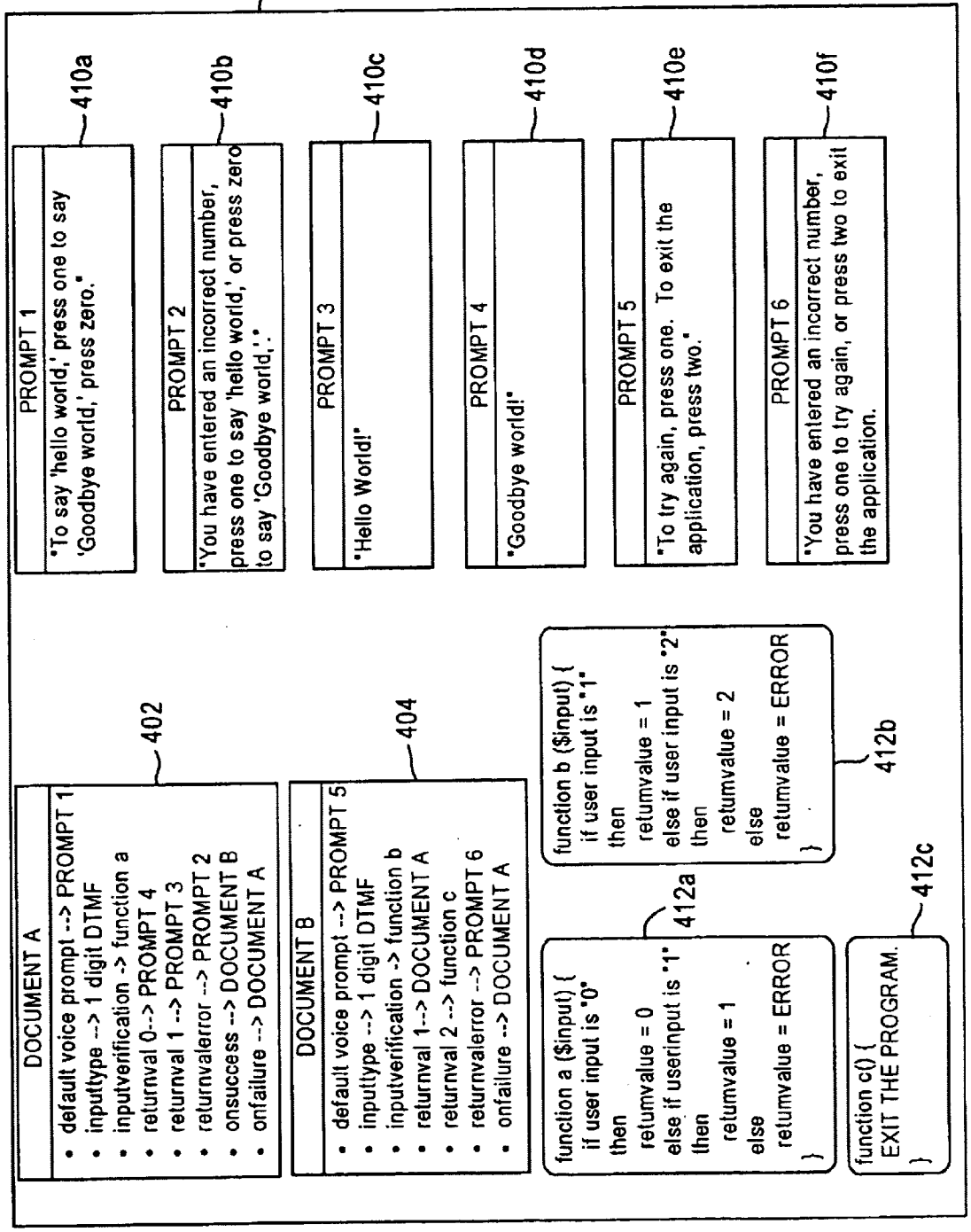
FIG. 5 is a diagram illustrating XML-type documents, and associated resources and procedures, used to define the application described with respect to FIG. 4
Figure 6:
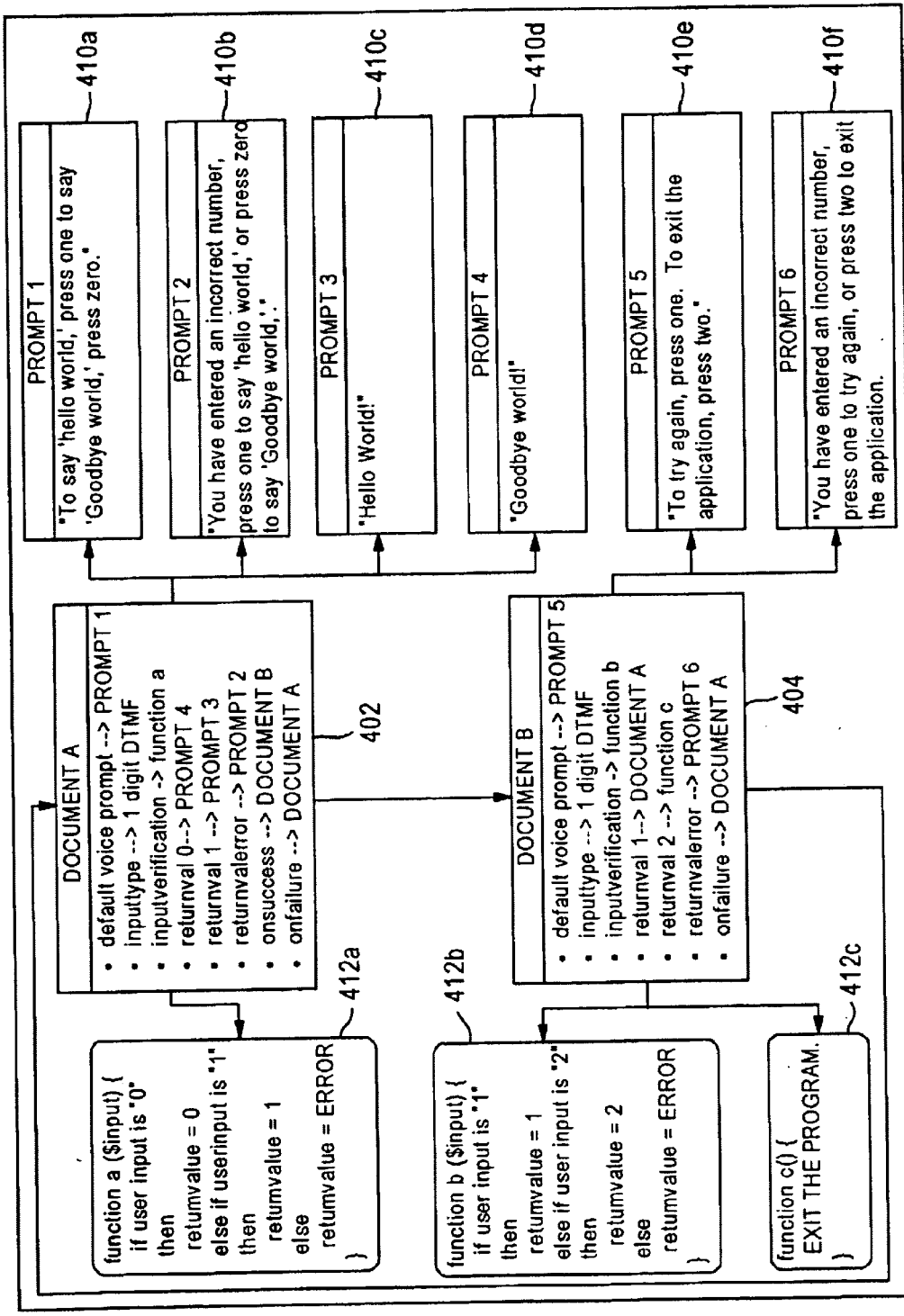
FIG. 6 a diagram illustrating a relationship diagram describing the application specified by the XML-type documents of FIG. 5 and generated by the application server of FIG. 3 according to an embodiment of the present invention.

An understanding of the self-documenting nature of XML documents will become more readily apparent from the following description of FIGS. 4, 5 and 6. FIG. 4 is a diagram illustrating an implementation 400 of a relatively simple program entitled "Hello World" written using an executable code. One needs a detailed understanding of the programming language used for the implementation 400 to even begin deciphering the flow of the application. In contrast, defining the application using a set of documents 402 and 404, illustrated in FIG. 5 within the context of an application runtime environment 406 that specifies a simple set of rules relating the documents 402 and 404, enables the generation of a directed graph 408, illustrated in FIG. 6, from which various forms of documentation can be extracted.

FIG. 5 illustrates documents 402 and 404, which are used to define application operations using prescribed functions within an application runtime environment 406. The documents 402 and 404 as illustrated are not actual XML documents according to XML format, but illustrate document tags (that can be written in XML) that specify application operations to be executed by the application runtime environment 406. The application runtime environment 406 is a simplified representation of the XML-based application runtime environment 100 for ease of illustration, but is intended to include all the functionality of the application runtime environment 100 described with respect to FIG. 3A. For example, document 402 ("Document A") and document 404 ("Document B") each specify a default voice prompt tag from available voice resources 410 to be played for a user, an input type tag that specifies the expected input to be validated, an input verification tag that specifies a procedure call to a prescribed function 412 for verification of the user input, decision tags ("returnval") that specify an action to be performed based on the value returned by the called procedure, and action tags ("onsuccess" and "onfailure") that specify the next document to be executed based on the application runtime environment 406 determining a result of the user input. More specific examples of identifying voice application operations using tags specifically implemented in XML are described with respect to FIGS. 8A to 8E in the above-incorporated application Ser. No. 09/501,516.

In contrast to the code-implemented application 400, the documents 402 and 404 separate logic from functions and user interface. Hence, the call flow relationship diagram 408 can be generated based on parsing the documents 402 and 404, and explicitly specifying the relationships between the tags within the documents 402 and 404, the resources 410, and the function calls 412 that are established during execution by the application runtime environment 406. Moreover, the call flow relationship diagram 408 can be generated by the application runtime environment 406 without parsing or examination of the underlying executable code used to execute the tags within the documents 402 or 404.

Figure 7:
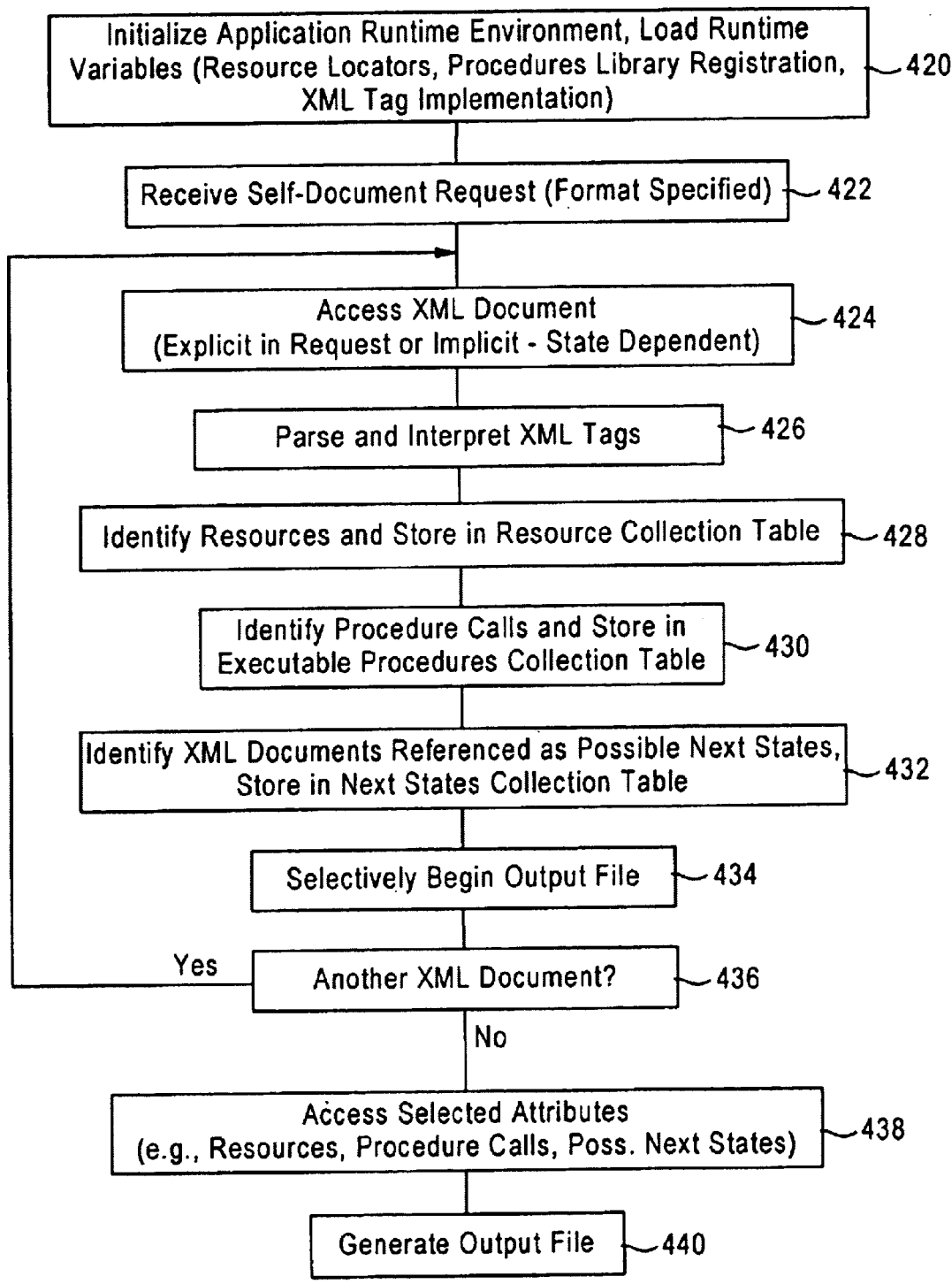
FIG. 7 is a diagram illustrating the method by the application server of generating an output file that describes the voice application according to an embodiment of the present invention.

FIG. 7 is a diagram illustrating the method of describing a voice application defined by XML documents according to an embodiment of the present invention. The steps described in FIG. 7 can be implemented as executable code that is stored on a computer readable medium (e.g., a hard disk drive, a floppy drive, a random access memory, a read only memory, an EPROM, a compact disk, etc).

The method begins in step 420, where the application runtime environment 100 is initialized 2C by loading runtime variables such as resource locators from the voice resource directory 114, library registration parameters for the procedures library 112, and prescribed XML tag executable routines and/or XML tag definitions from the tag implementation module 106. The application runtime environment 100, having loaded the necessary runtime variables for execution of XML tags within the context of the application runtime environment, receives from a user in step 422 a self-document request that specifies a prescribed format, for example a user prompt menu, a resource utilization table, a call flow diagram, etc. Typically the request may specify either a single XML document, or may specify a prescribed sequence of voice application operations. The application runtime environment 100 accesses in step 424 the documents related to the request that sequence of voice application operations, for example by identifying the application state specified in the user's brownie (stored in the registry 92) if the XML document is not specifically identified in the user request.

The XML parser 102 within the application runtime environment 100 then parses in step 426 the XML tags in the referenced XML document, and interprets the XML tags based on the context-specific rule sets specified by the tag implementation module 106.

The parser 102 then identifies the resources, for example the voice resources 410, that are referenced by the parsed XML document in step 428, and stores the identified resources within an entry for the corresponding parsed XML document in the resource collection table 118. The parser 102 also identifies any procedure calls to the procedures library 112 specified in the parsed XML tags, for example procedures 412, and stores in step 430 the identified procedure calls within an entry for the corresponding parsed XML document in the executable procedures collection table 120. The parser 102 also identifies other XML documents referenced as possible next states, and stores in step 432 the possible next states within an entry for the corresponding parsed XML document in the next states collection table 122. For example, the next states collection table entry for document 402 ("Document A") would reference the documents 404 and 402, specified in the action tags "onsuccess" and "onfailure", respectively.

Hence, the context collection module 116 stores the attributes of the parsed XML documents as explicit references to resources, procedure calls, and possible next states that are otherwise 2 implicit during execution of the XML documents during application runtime. Once the application runtime environment 100 has collected the attributes describing execution of the XML tags within an XML document, the output module 124 is able to begin generation of the output file that describes the voice application, depending on the user selected output format in step 434 (e.g., if the output request specifies a text file that does not require state-dependent output generation).

The application runtime environment 100 in step 436 accesses another XML document, if necessary, and repeats the process for collecting the attributes for the accessed XML document. For example, the application runtime environment 100 may access each of the XML documents specified in the next states collection table 122 for the first XML document entry.

Once the application runtime environment has collected the attributes for all relevant XML documents associated with a prescribed voice application operation, the output module 124 generates the output file by accessing selected attributes in step 438 from the collection table 118,120, and 122, and outputs the file in step 440, for example by storing as a text file, graphic file, etc. on a tangible medium or printing the document. As described above with reference to FIG. 3B, the output module 124 selects collected attributes based on the type of documentation requested by the user.

Hence, the output module 124 may generate different types of output documents, for example the context relationship diagram illustrated in FIG. 6, a menu call flow diagram, a list of default prompts, a list of all documents that reference the selected resource 410, a list of all resources (e.g., voice prompts) utilized by a selected XML document.

Another example of the flexibility provided by the above-described arrangement involves an example where the keystroke *8 represents a transfer function for transferring the call outside a customer premises: assume that an administrator decides to no longer permit external transfers. The above-described arrangement could be used to generate two forms of documentation, the first identifying every user menu that used the *8 option, and the second specifying how to reach each of the user menus from an initial entry state.

According to the disclosed embodiment, voice applications defined by XML documents can be automatically documented based on user-selected requirements by parsing the XML documents, and collecting attributes describing execution of the XML tags of the XML documents within the application runtime environment. An output file can be generated that describes the voice application based on selecting the collected attributes based on user selection. Hence, the voice applications defined by XML documents can be considered as self-documenting, and the act of writing the applications using XML documents generates the necessary information for creating and formatting documentation in accordance with the attributes (i.e., context) provided by the application runtime environment.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server configured for executing a voice application, the method comprising:

parsing an extensible markup language (XML) document having XML tags for defining voice application operations;

collecting attributes describing execution of the XML tags by the application server within an application runtime environment; and generating for storage on a tangible medium an output file for use as user documentation that describes the voice application by outputting at least a portion of the collected attributes based on a user selection of an output format for the output file.

2. The method of claim 1, wherein the collecting step includes:

identifying resources specified by the XML tags for selective execution based on respective specified conditions; and storing the identified resources in a resource collection table.

3. The method of claim 2, wherein the identified resources include sound files configured for storing voice prompts, the step of storing the identified resources including storing the name of the sound files.

4. The method of claim 3, wherein the sound files are stored in .wav format, each sound file having a corresponding text field for storing a corresponding text prompt, the step of storing the identified resources further including storing the text prompt concurrently with the respective sound files.

5. The method of claim 2, wherein the collecting step further includes:

identifying executable procedures specified by the XML tags for selective execution based on the respective specified conditions; and storing the identified executable procedures in an executable procedures collection table.

6. The method of claim 5, wherein the step of identifying executable procedures includes identifying a procedure call to an external resource.

7. The method of claim 5, wherein the collecting step further includes:
    identifying possible next states of the voice application specified by the XML tags based on the respective specified conditions; and
    storing the possible next states in a next states collection table.

8. The method of claim 7, wherein the generating step includes selecting for the output file the attributes from at least one of the resource collection table, the executable procedures collection table, and the next states collection table, based on the user selection.

9. The method of claim 8, wherein the generating step further includes selecting for the output file the attributes based on the user selection specifying one of a user prompt menu, a resource utilization table, and a call flow diagram.

10. The method of claim 7, wherein the step of storing the possible next states includes storing within an entry of the next states collection table, corresponding to the XML document, the possible next states.

11. The method of claim 5, wherein the step of storing the identified executable procedures includes storing within an entry of the executable procedures collection table, corresponding to the XML document, the identified executable procedures.

12. The method of claim 2, wherein the step of storing the identified resources includes storing within an entry of the resource collection table, corresponding to the XML document, the identified resources.

13. The method of claim 1, wherein the parsing step includes obtaining context information relative to the application runtime environment for each XML tag in the XML document.

14. The method of claim 13, wherein the obtaining step includes:
    interpreting for each XML tag a corresponding operation;
    locating referenced XML documents that are specified within the XML tags;
    identifying referenced procedure calls that are specified within the XML tags; and
    locating resources specified within the XML tags.

15. The method of claim 13, wherein the obtaining step includes interpreting each XML tag based on at least one of execution of a prescribed routine corresponding to said each XML tag and referencing of a tag list that specifies a corresponding operation for said each XML tag.

16. An application server comprising:
    a storage medium configured for storing extensible markup language (XML) documents having XML tags that define voice application operations for a voice application; and
    an application runtime environment configured for generating an output file for storage on a tangible medium and for use as user documentation that describes selected attributes of the voice application, the application runtime environment having a parser configured for determining attributes of the respective XML tags within each of the XML documents according to the application runtime environment, and a context collection module configured for storing the determined attributes, the application runtime environment selecting the stored determined attributes based on a user selection of an output format for the output file.

17. The application server of claim 16, wherein the application runtime environment includes a tag implementation module configured for executing the respective voice application operations specified by the XML tags, the tag implementation module having an executable library configured for storing executable routines for a first group of the XML tags, and a tag list that describes the voice application operations for a second group of the XML tags, the parser configured for determining the attributes based on the executable library and the tag list.

18. The application server of claim 17, wherein the application runtime environment includes a resources directory configured for identifying respective locations of resources specified in the XML documents, the parser configured for determining the attributes based on the resources directory.

19. The application server of claim 18, wherein the resources are stored as voice prompts, each voice prompt having audio data and text data specifying contents of the corresponding voice prompt.

20. The application server of claim 18, wherein the application runtime environment includes a procedures library configured for specifying executable procedures configured for generating respective procedure calls to prescribed external resources, the parser configured for determining the attributes based on the procedures library.

21. The application server of claim 20, wherein the context collection module includes:
    a resource collection table configured for storing the resources determined by the XML parser to be specified by a corresponding parsed XML document;
    an executable procedures collection table configured for storing the executable procedures determined by the XML parser to be specified by the corresponding parsed XML document; and
    a next states collection table configured for storing possible next states of the voice application determined by the XML parser to be specified by the corresponding parsed XML document, the application runtime environment selecting the stored determined attributes from the resource collection table, the executable procedures collection table, and the next states collection table based on the user selection.

22. The application server of claim 21, wherein the application runtime environment further includes an output module configured for generating the output file as any one of a user prompt menu, a resource utilization table, and a call flow diagram, based on the user selection.

23. A computer readable medium having stored thereon sequences of instructions for describing a voice application, the sequences of instructions including instructions for performing the steps of:
    parsing an extensible markup language (XML) document having XML tags for defining voice application operations;
    collecting attributes describing execution of the XML tags by the application server within an application runtime environment; and
    generating for storage on a tangible medium an output file for use as user documentation that describes the voice application by outputting at least a portion of the collected attributes based on a user selection of an output format for the output file.

24. The medium of claim 23, wherein the collecting step includes:
    identifying resources specified by the XML tags for selective execution based on respective specified conditions; and storing the identified resources in a resource collection table.

25. The medium of claim 24, wherein the identified resources include sound files configured for storing voice prompts, the step of storing the identified resources including storing the name of the sound files.

26. The medium of claim 25, wherein the sound files are stored in .wav format, each sound file having a corresponding text field for storing a corresponding text prompt, the step of storing the identified resources further including storing the text prompt concurrently with the respective sound files.

27. The medium of claim 24, wherein the collecting step further includes:
   identifying executable procedures specified by the XML tags for selective execution based on the respective specified conditions; and
   storing the identified executable procedures in an executable procedures collection table.

28. The medium of claim 27, wherein the step of identifying executable procedures includes identifying a procedure call to an external resource.

29. The medium of claim 27, wherein the collecting step further includes:
   identifying possible next states of the voice application specified by the XML tags based on the respective specified conditions; and
   storing the possible next states in a next states collection table.

30. The medium of claim 29, wherein the generating step includes selecting for the output file the attributes from at least one of the resource collection table, the executable procedures collection table, and the next states collection table, based on the user selection.

31. The medium of claim 30, wherein the generating step further includes selecting for the output file the attributes based on the user selection specifying one of a user prompt menu, a resource utilization table, and a call flow diagram.

32. The medium of claim 29, wherein the step of storing the possible next states includes storing within an entry of the next states collection table, corresponding to the XML document, the possible next states.

33. The medium of claim 27, wherein the step of storing the identified executable procedures includes storing within an entry of the executable procedures collection table, corresponding to the XML document, the identified executable procedures.

34. The medium of claim 23, wherein the step of storing the identified resources includes storing within an entry of the resource collection table, corresponding to the XML document, the identified resources.

35. The medium of claim 23, wherein the parsing step includes obtaining context information relative to the application runtime environment for each XML tag in the XML document.

36. The medium of claim 35, wherein the obtaining step includes:
   interpreting for each XML tag a corresponding operation;
   locating referenced XML documents that are specified within the XML tags;
   identifying referenced procedure calls that are specified within the XML tags; and
   locating resources specified within the XML tags.

37. The medium of claim 35, wherein the obtaining step includes interpreting each XML tag based on at least one of execution of a prescribed routine corresponding to said each XML tag and referencing of a tag list that specifies a corresponding operation for said each XML tag.

38. An application server comprising:
   a storage medium configured for storing extensible markup language (XML) documents having XML tags that define voice application operations for a voice application; and
   means for generating an output file for storage on a tangible medium and for use as user documentation that describes selected attributes of the voice application, generating means having a parser means for determining attributes of the respective XML tags within each of the XML documents according to the application runtime environment, and a context means for storing the determined attributes, the generating means selecting the stored determined attributes based on a user selection of an output format for the output file.

39. The application server of claim 38, wherein the generating means includes a tag implementation means for executing the respective voice application operations specified by the XML tags, the tag implementation means having an executable library configured for storing executable routines for a first group of the XML tags, and a tag list that describes the voice application operations for a second group of the XML tags, the parser means configured for determining the attributes based on the executable library and the tag list.

40. The application server of claim 39, wherein the generating means further includes a resources directory configured for identifying respective locations of resources specified in the XML documents, the parser means configured for determining the attributes based on the resources directory.

41. The application server of claim 40, wherein the resources are stored as voice prompts, each voice prompt having audio data and text data specifying contents of the corresponding voice prompt.

42. The application server of claim 40, wherein the generating means further includes a procedures library configured for specifying executable procedures configured for generating respective procedure calls to prescribed external resources, the parser means configured for determining the attributes based on the procedures library.

43. The application server of claim 42, wherein the context means includes:
   a resource collection table configured for storing the resources determined by the XML parser to be specified by a corresponding parsed XML document;
   an executable procedures collection table configured for storing the executable procedures determined by the XML parser to be specified by the corresponding parsed XML document; and
   a next states collection table configured for storing possible next states of the voice application determined by the XML parser to be specified by the corresponding parsed XML document, the application runtime environment selecting the stored determined attributes from the resource collection table, the executable procedures collection table, and the next states collection table based on the user selection.

44. The application server of claim 43, wherein the generating means further includes an output module configured for generating the output file as any one of a user prompt menu, a resource utilization table, and a call flow diagram, based on the user selection.

* * * * *